Patented May 19, 1936

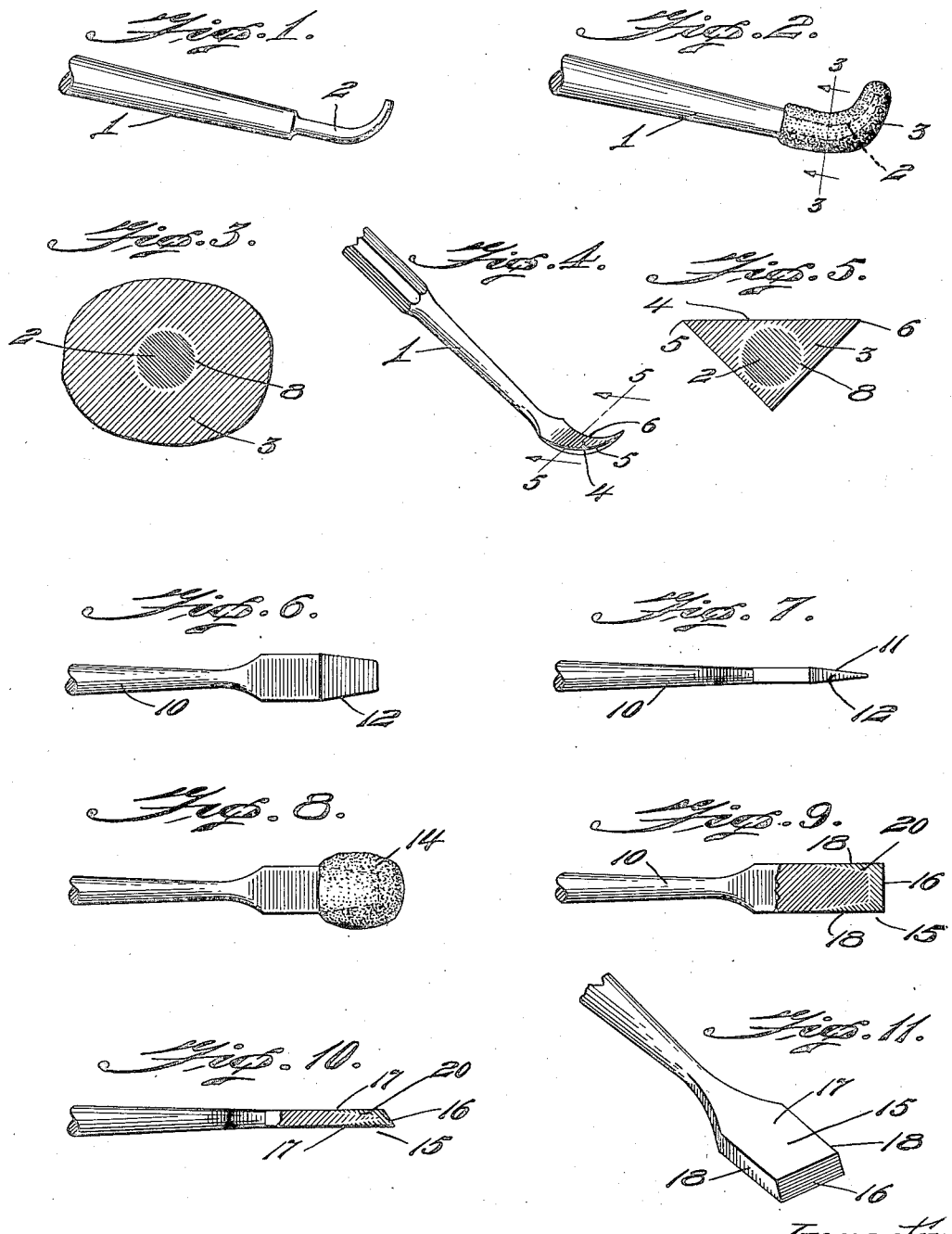

2,041,345

UNITED STATES PATENT OFFICE 2,041,345

METHOD OF MAKING A TOOL

Fernando O. Jaques, Providence, R. I., assignor to The Central Tool Company, Auburn, R. I., a corporation of Rhode Island Application June 2, 1932, Serial No. 614,961

7 Claims. (Cl. 76—104)

This invention relates to the method of making an improved tool, and may be said to consist more particularly in the provision of a cutting or scraping tool having the cutting or scraping edge thereof formed of a metal having a considerably greater degree of hardness than that of the metal making up the main body portion of the tool, which is accomplished by applying a surface layer or cutting edge portion made up of a high speed alloy to the tool body in such a manner as to form a perfect union with the metal of the body, and then grinding off a portion of the applied metal to form a cutting or scraping edge.

It has been proposed heretofore to form cutting edges for certain types of tools by welding thereto particles of highly abrasive materials, such as tungsten carbide and the like, in order to utilize the extreme hardness and highly abrasive qualities of these and similar substances for cutting purposes, where the cutting action is to be accomplished by means of an abrasive medium. The present invention, however, is distinguished from devices and methods of that character by being directed to the formation of tools, the cutting edges of which are of a nonabrasive character, and in the formation of which it is desirable to provide a fine and uniform cutting edge possessing a high degree of hardness and capable of use without being tempered, as well as a cutting edge which may be subjected to a high temperature without losing its sharpness or impairing its efficiency. It has also been the practice heretofore to weld one end portion of a cast stellite cutter to a steel shank by means of a low melting point welding material such as copper or low fusion cast iron in order to use short lengths of cast stellite, but in such cases the stellite forming the cutting edge is that obtained by casting and contains many small air bubbles and imperfections which would render it unfit for use in cases where a fine and uniform cutting edge was necessary.

One object of the present invention is the provision of an improved cutting tool wherein the cutting edge is formed from a relatively hard metal compound or alloy having a fine and uniform texture throughout its extent whereby it is capable of being ground to a fine edge, and which metal compound or alloy is capable of being firmly joined to the metal of the tool body in such a manner as to form in effect an integral part thereof.

Another object of the invention is the provision of an improved method of joining certain hard metal alloys, such as stellite, to a metal base to effect an intimate union between the metal base and alloy, and at the same time provide a coating of the alloy which will be free from air bubbles and other imperfections and capable of taking a fine and uniform cutting edge which in addition to being of a fine and uniform character throughout its extent and after successive regrindings, will have the advantages characteristic of such hard alloy in that it will possess extreme hardness and maintain its fine cutting edge at high temperatures.

Another object of the invention is the provision of an improved method of forming a tool of this character by intimately uniting a hard metal compound or alloy with the metal of the tool to effect a complete and perfect union of the joining metals in such a manner that the hard metal or alloy forming the cutting edge will be present as a homogeneous mass possessing a fine and uniform texture free from air holes or other imperfections such as would tend to prevent the formation of a fine and uniform cutting edge.

Other objects and advantages of the invention relate to various improved details of construction and arrangements of the joined metals, together with improved steps and arrangements of steps in the formation of the same as will be more fully set forth in the detailed description to follow.

Referring to the drawing:—

Fig. 1 is a side elevational view of a portion of a tool base, such as may be employed in the formation of one type of dental tool provided with a reduced end for receiving the hard metal or alloy, Fig. 2 is a side elevational view of the tool base portion shown in Fig. 1, after the reduced end has been dipped in the molten alloy or composition metal, showing the mass of applied metal in position upon the reduced end of the tool, Fig. 3 is a transverse sectional view, taken substantially along the line 3—3 of Fig. 2, and showing the location of the metals in the end portion of the tool base, Fig. 4 is a perspective view of a portion of the tool shown in Figs. 1 to 3 after the hard metal applied to the end portion of the tool base has been ground to give it the desired shape, Fig. 5 is a transverse sectional view, taken substantially along the line 5—5 of Fig. 4, and showing the shape of the cutting or scraping edges after the tool has been ground into its final form, Fig. 6 is a top plan view of a portion of a tool handle or tool base which may be employed in forming another type of dental tool, Fig. 7 is a side elevational view of the tool handle or tool base shown in Fig. 6, Fig. 8 is a top plan view of the tool base or handle shown in Fig. 6 after the end portion has been dipped in the molten hard metal, showing substantially the position and extent of the hard metal secured to the end of the tool base, Fig. 9 is a top plan view, partially in section, of the completed tool after the hard metal end portion has been ground off to form the cutting edge, Fig. 10 is a side elevational view, partially in section, of the completed tool, showing substantially the location of the different metals, and, Fig. 11 is a perspective view of a portion of the completed tool shown in Figs. 6 to 10, inclusive.

In carrying out the invention I employ a tool body formed from any suitable grade of iron, steel or other suitable metal which may be found to be adapted to make such a complete and perfect union with the hard metal or alloy when treated in the manner described herein as will be adequate for the purpose of supporting the metal alloy after the manner set forth, and I propose to apply thereto a coating of a hard metal compound or alloy for forming the cutting edge, such metal compound preferably consisting of one of the high speed alloys, such as may contain cobalt and one or more metals of the chromium group. While the invention is adapted to be employed in connection with a variety of metals and alloys, both in the metal employed in forming the main body portion of the tool, as well as in the harder metal compound or alloy to be applied thereto for forming the cutting edge, it is more particularly described herein in connection with the use of one of the ordinary commercial steels, such as stainless steel, for forming the main body portion of the tool and in the use of one of the high speed alloys, such as may contain a substantial portion of cobalt or nickel and one or more metals of the chromium group, such alloys while varying considerably in composition, being generally known to the trade by the name of "stellite".

These hard alloys are generally characterized by extreme hardness as well as the ability to retain a cutting edge at high temperatures without materially affecting its cutting qualities, but they have been found heretofore to be practically impossible to work by drawing, forging, or the like, in order to give them the desired shape for cutting purposes, so that at the present time their use as cutting tools is generally limited to castings. The ordinary casing formed from these materials, while capable of being ground off to provide a cutting edge adequate for certain purposes, such as use in lathes and the like, are nevertheless of a non-homogeneous character, that is containing air holes, flaws and other imperfections in the metal itself which would render them unfit for use in the formation of cutting tools where a fine and uniform texture of the metal is an essential prerequisite to the formation of a fine cutting edge, which must of necessity be of a substantially uniform character throughout its extent.

The difficulty encountered in working these hard alloys has heretofore been an obstacle to their use in the formation of tools having fine cutting edges, and even in the formation of such tools as may from their nature be capable of being formed by casting, the non-homogeneous character of the cast metal and its brittleness practically prohibits its use for many purposes.

Heretofore, in the application of a stellite shape to ordinary iron or steel tools or shapes the stellite shape has been joined to the iron or steel shape through the intermediary of a weld forming metal possessing a lower fusion point than the stellite, such as copper or low fusion cast iron, and no instance is known where by such method it was possible to obtain either a homogeneous union between the metals or a fine and uniform grain throughout the applied stellite.

I have found, however, that hard metal alloys of this character are capable of application in the form of a relatively thin layer to iron, steels or the like in such a manner as to make a perfect and intimate union with the metal base and provide a surface of the alloy which possesses a homogeneous structure of a fine and uniform texture throughout its extent in such a manner that upon a portion of the applied alloy being ground off there is formed a fine and perfect cutting edge of a uniform character throughout its extent. In applying the hard metal or alloy to the tool I preferably melt a small quantity of the hard metal by any suitable means, as by the oxy-acetylene torch so as to completely liquefy the same in the form of a small globule, or melt the alloy in an enclosed crucible placed in a furnace. In liquefying the alloy by means of an oxy-acetylene torch I prefer to employ an excess of acetylene in order to effect the liquefaction in a non-oxidizing atmosphere and thereby prevent oxidation of the metal. Upon liquefying the hard metal I dip the end of the tool body into the molten metal mass sufficiently to form a coating or globular mass of the harder metal about the end of the tool body. By dipping the tool end slightly below the surface of the molten metal a relatively small portion of the molten metal adheres to the tool body, and this metal being applied directly to the tool from its quiescent molten state forms a surface mass which is free from bubbles of air or other flaws and unites firmly with the metal of the tool body, which has been previously cleaned, to form a perfect union therewith without the use of a flux. After the coating of hard alloy has been applied as above described, it may be ground off by means of an emery wheel or other abrasive to form sharp and uniformly textured cutting or scraping edges of the desired shape for the tool.

The hard metal or alloy when applied to the end of a tool base as above described differs radically from the form in which it occurs in the ordinary cast stellite cutting tool in that it is of a fine and homogeneous texture throughout its extent, that is, the particles appear to be closely compacted together to form a fine textured metal throughout its entire extent without air bubbles or imperfections present therein so that it may be ground off to form a fine and uniform cutting edge. It is also to be noted that when the metal or alloy is applied to a metal base after the manner described, it forms an extremely close and intimate union with the metal to such an extent that if the surface of the metal is free from oxidation it is practically impossible to determine the line of juncture of the dissimilar metals.

In the embodiment of the invention illustrated herewith I designates a tool handle or base provided with a reduced curved end portion 2. In forming the cutting tool the reduced end portion 2 is dipped in a small quantity of the molten alloy and retains a portion of the alloy which unites therewith and may assume the form as shown in Fig. 2 of the drawing, wherein the metal alloy is indicated by the reference character 3. The coating or alloy metal 3 unites closely with the metal forming the tool handle or base. After the application of the metal alloy to the end portion 2 of the tool, the applied metal may be ground off by means of an abrasive wheel or the like to form a blade having a curved face 4 terminating in opposite cutting edges 5 and 6. In the sectional views 3 and 5, the metal of the tool end is designated by the reference character 2 while the applied metal is indicated at 3, with the numeral 8 designating approximately the line of juncture of the dissimilar metals.

In that form of tool shown in Figs. 6 to 11 of the drawing, 10 designates the tool base which may be of any suitable metal which will unite with the alloy as previously stated, the tool base being conveniently formed with inclined or beveled side and edge portions 11 and 12 respectively, for a purpose which will be more fully set forth hereinafter. Upon dipping the end portion of the tool base 10 in the molten alloy, a mass 14 of the alloy will be placed upon the end of the tool base substantially after the manner shown in Fig. 8 of the drawing. This applied metal is then ground off to form a cutting tool end 15 as shown in Figs. 9, 10 and 11, whereby there is provided an inclined cutting edge 16 for the tool. In grinding off the applied metal the side faces 17 and the side edges 18 of the tool may be ground straight as shown in Figs. 9 and 10, to provide a slight excess of the applied metal upon the inclined side and edge surfaces 11 and 12 of the tool end, sufficient in amount to permit the necessary regrinding of the cutting edge 16 without exposing the metal of the tool base. In Figs. 9 and 10, the reference character 20 indicates approximately the line of juncture of the dissimilar metals and it will be seen that in this case as in that of the tool shown in Figs. 1 to 5 inclusive, the hard alloy is so applied as to completely surround the end portion of the tool base in such a manner as to provide a sufficient quantity of the hard metal to permit the necessary regrinding of the cutting edges without exposing the metal of the tool base, while at the same time the metal of the tool base extends within and serves as a support for the hard metal throughout substantially the entire extent of the formed cutting edge.

The union of the metals in tools formed after the manner herein described is so intimate that the line of juncture between the metals is practically indistinguishable upon grinding across the joined metals, and is indicated in the drawing merely for the purpose of illustrating the shape and relative location of the dissimilar metals. The joining of the metals is so complete and uniform as to indicate a substantially complete merger of the metal particles or molecules with each other throughout the meeting area to form a substantially homogeneous grain structure.

In forming the tools after the manner described the interior of the molten hard metal may be maintained at a relatively high temperature and is free from air or other contaminating substances upon its application to the supporting metal thus permitting a closer and more intimate union being formed between the dissimilar metal particles than could be accomplished by welding or similar methods. The present method of heat coating a supporting metal with the hard metal also permits the application of the hard metal to substantially the thickness desired through two or more immersions, if necessary, and applies the metal in a form free from airlike bubbles or other imperfections and in such a manner as to impart to the applied metal a fine and uniform grain texture.

Dipping a portion of the supporting metal in a molten mass of the applied metal presents various advantages over all previous attempts to apply a coating or surface of hard metal alloy of this character to a supporting metal in that it permits the application of the hard metal alloy to be made to the surface of the supporting metal at a uniform temperature throughout which is considerably in excess of any which may be employed in flowing or casting the alloy on the metal, and also enables the union of the metals to be effected with complete exclusion of the atmosphere from the meeting areas of the dissimilar metals.

While the invention has been illustrated in connection with certain types of dental tools, it is to be understood that its use is not to be limited to tools of that character nor even to cutting tools generally, except as may be specifically set forth in the appended claims, since certain features of the invention are of broad application in the metal working art, and it is not my intention to limit such features of the invention to use with any particular structure since they are capable of general application wherever it may be found desirable to form a homogeneous layer of hard metal alloy having a fine and uniform grain texture throughout its extent upon a supporting metal such as may be capable of uniting firmly with the metal alloy.

What I claim is:—

1. The process of forming a stellite edged cutting tool which comprises, immersing a ferrous metal shape in molten stellite to form an adherent stellite mass surrounding a portion of the ferrous metal shape and intimately united therewith throughout the entire extent of their meeting surfaces and provide an enveloping stellite sheath therefor which is of a fine and uniform grain texture throughout its extent, and then removing a portion of the applied stellite to form a cutting edge located wholly within the applied stellite.

2. The process of applying a thin layer of stellite to a ferrous metal shape possessing a lesser degree of hardness than the stellite which comprises, liquefying the stellite and dipping the ferrous metal shape in the molten stellite to form a thin, substantially uniform grained stellite covering for the ferrous metal shape which forms an integral union with the metal of the shape throughout the extent of their meeting surfaces.

3. The process of making a tool having a ferrous metal core and a hard metal operating surface which comprises, forming a tool body from a ferrous metal, dipping a portion of the tool body in molten stellite to apply a stellite coating and effect an intimate union between the ferrous metal body and stellite under uniform temperature and foreign matter excluding conditions, and then removing a portion of the applied stellite to provide a stellite operating surface.

4. The process of making a tool having a ferrous metal core and a hard heat resistant operating surface which comprises, shaping a tool body from a ferrous metal, liquefying a hard, heat resistant metal alloy containing principally cobalt and chromium, immersing a portion of the ferrous metal body in the molten hard metal alloy to form an adherent coating of said hard metal entirely surrounding a portion of the ferrous metal shape and forming an integral and uniform union therewith throughout the entire extent of the meeting surfaces of the different metals.

5. The process of uniting stellite to a ferrous metal shape which comprises, applying an enveloping coating of liquid stellite to a portion of a ferrous metal shape so as to bring the liquid stellite into effective contact with all parts of the ferrous metal shape to which it is applied substantially simultaneously and with automatic exclusion of gaseous impurities adapted to affect injuriously the union of the metals by immersing that part of the ferrous metal shape to which the stellite is applied in molten stellite.

6. The process of applying an enveloping coating of stellite to a portion of a metal containing iron and possessing a lesser degree of hardness than the stellite to effect a direct and intimate union of the metals throughout their meeting areas which comprises, applying an enveloping coating of liquid stellite to all parts of the metal to be coated substantially simultaneously with exclusion of foreign matter from the meeting surfaces by immersing the portion of the metal to be coated in a bath of molten stellite.

7. The process of applying a coating of stellite to a ferrous metal which comprises, the step of applying the stellite to the ferrous metal in liquid form and coating all parts of the metal base to which the stellite is to be applied substantially simultaneously and while maintaining the stellite at a substantially uniform temperature by dipping the ferrous metal in molten stellite, whereby a direct and intimate union is effected between the metals throughout the entire extent of their meeting areas.

FERNANDO O. JAQUES.